US009443288B1

(12) United States Patent
Yang (10) Patent No.: US 9,443,288 B1
(45) Date of Patent: Sep. 13, 2016

(54) SCALE ADAPTIVE BLIND DEBLURRING (71) Applicant: Adobe Systems Incorporated, San Jose, CA (US)

(72) Inventor: Jianchao Yang, Venice, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/692,993

(22) Filed: Apr. 22, 2015

(51) Int. Cl.
G06K 9/40 (2006.01)
G06T 5/00 (2006.01)
G06T 5/10 (2006.01)

(52) U.S. Cl.
CPC ........ G06T 5/002 (2013.01); G06T 5/10 (2013.01)

(58) Field of Classification Search
CPC ......... G06T 5/002; G06T 5/003; G06T 5/10; G06T 2207/20012; G06T 2207/20016
See application file for complete search history.

(56) References Cited

U.S. PATENT DOCUMENTS

| 2007/0217713 | A1* | 9/2007 | Milanfar | G06T 3/4053 382/299 |
| 2010/0074552 | A1* | 3/2010 | Sun | G06T 5/003 382/264 |
| 2014/0023291 | A1* | 1/2014 | Lin | G06T 5/003 382/279 |

OTHER PUBLICATIONS

Candés, et al., "Towards a Mathematical Theory of Super-Resolution," CoRR, abs/1203.5871, 2012. pp. 1-48.
Cho, et al., "Fast Motion Deblurring," SIGGRAPH AISA, 2009. 8 pages.
Ekanadham, et al., "A blind deconvolution method for neural spike identification," NIPS, 2011. 9 pages.
Farbman, et al., "Edge-Preserving Decompositions for Multi-Scale Tone and Detail Manipulation," SIGGRAPH, 2008. 10 pages.
Fergus, et al., "Removing Camera Shake from a Single Photograph," SIGGRAPH, 2006. 8 pages.
Gupta, et al., "Single Image Deblurring Using Motion Density Functions," ECCV, 2010. 14 pages.
Harmeling, et al., "Space-Variant Single-Image Blind Deconvolution for Removing Camera Shake," NIPS, 2010. 9 pages.
Karklin, et al., "Efficient coding of natural images with a population of noisy Linear-Nonlinear neurons," NIPS, 2011. 9 pages.
Krishnan, et al., "Blind Deconvolution Using a Normalized Sparsity Measure," CVPR, 2011. 8 pages.
Levin, et al., "Deconvolution using natural image priors," Technical Report, MIT, 2007. 3 pages.

(Continued)

Primary Examiner — Phuoc Tran
(74) Attorney, Agent, or Firm — Finch & Maloney PLLC (57) ABSTRACT

Techniques are disclosed for removing blur from a single image by accumulating a blur kernel estimation across several scale levels of the image and balancing the contributions of the different scales to the estimation depending on the noise level in each observation. In particular, a set of observations can be obtained by applying a set of variable scale filters to a single blurry image at different scale levels. A single blur kernel can be estimated across all scales from the set of observations and used to obtain a single latent sharp image. The estimation at a large scale level is refined using the observations at successively smaller scale levels. The filtered observations may be weighted during the estimation to balance the contributions of each scale to the estimation of the blur kernel. A deblurred digital image is recovered by deconvolving the blurry digital image using the estimated blur kernel.

14 Claims, 9 Drawing Sheets
(2 of 9 Drawing Sheet(s) Filed in Color)

(56) References Cited

OTHER PUBLICATIONS

Levin, et al., "Efficient Marginal Likelihood Optimization in Blind Deconvolution," CVPR, 2011. 8 pages.
Levin, et al., "Understanding and evaluating blind doconvolution algorithms," IEEE Trans. Pattern Anal. Mach. Intell., 33(12):2354-2367. 2011.
Lindeberg, et al., Linear scale-space: I. Basic theory, II. Early visual operations. Geometry-Driven Diffusion in Computer Vision, 1994. 87 pages.
Lowe, et al., "Distinctive Image Features from Scale-Invariant Keypoints," International Journal of Computer Vision, 60(2):91-110, 2004.
Mobahi, et al., "Seeing through the Blur," CVPR, 2012. 20 pages.
Shan, et al, "High-quality Motion Deblurring from a Single Image," ACM SIGGRAPH, 2008. 10 pages.
Tai, et al., "Motion-aware noise filtering for deblurring of noisy and blurry images," CVPR, 2012. 8 pages.
Tai, et al., "Richardson-Lucy Deblurring for Scenes under Projective Motion Path," IEEE Trans. Pattern Anal. Mach. Intell., 33(8):1603-1618, 2011. 13 pages.
Tomasi, et al., "Bilateral Filtering for Gray and Color Images," Proceedings of the 1998 IEEE-ICCV. 8 pages.
Tschumperlé, et al., "Vector-Valued Image Regularization with PDE's: A Common Framework for Different Applications," IEEE Trans. Pattern Anal. Mach. Intell., 27(4):506-517, 2005. 6 pages.
Wipf, et al., "Revisiting Bayesian Blind Deconvolution," Journal of Machine Learning Research 15 (2014). pp. 3595-3634.
Xu, et al., "Two-Phase Kernel Estimation for Robust Motion Deblurring," ECCV, 2010. pp. 157-170.
Xu, et al., "Image Smoothing via L0 Gradient Minimization," ACM Trans. Graph., 30(6):174, Dec. 2011. 12 pages.
Xu, et al., "Unnatural L0 Sparse Representation for natural Image Deblurring," CVPR, 2013. 8 pages.
Xu, et al., "Single Image Blind Deblurring With Image Decomposition," ICASSP, 2012. 4 pages.
Zhang, et al., "Non-Uniform Camera Shake Removal Using a Spatially-Adaptive Sparse Penalty," NIPS, 2013. 9 pages.
Zhong, et al., "Handling Noise in Single Image Deblurring using Directional Filters," CVPR, 2013. 8 pages.

* cited by examiner

Uniform Blur Equation $$\min_{\{\lambda_p\}, k \geq 0, x} \sum_{p=1}^{P} \frac{1}{\lambda_p} \|f_p * y - f_p * k * x\|_2^2 + \sum_{p,i} \min_{Y_i} \frac{x_i^2}{Y_i} + \log\left(\lambda_p + Y_i \|k_p\|_2^2\right) + (n-m) \sum_p \log \lambda_p$$

FIG. 3B

Non-uniform Blur Equation $$\min_{\lambda, w \geq 0, x} \sum_{p=1}^{P} \frac{1}{\lambda_p} \|y_p - H_p x\|_2^2 + \sum_{p,i} \min_{Y_i} \frac{x_i^2}{Y_i} + \log\left(\lambda_p + Y_i \|h_{ip}\|_2^2\right) + (n-m) \sum_p \log \lambda_p$$

SCALE ADAPTIVE BLIND DEBLURRING

FIELD OF THE DISCLOSURE

This disclosure relates to the field of image processing, and more particularly, to techniques for removing blur from a single image.

BACKGROUND

Image blur is an undesirable degradation that often accompanies the image formation process due to factors such as camera shake. Blind deconvolution is an image deblurring technique that permits recovery of a sharp image from a single blurry observed image in the presence of a poorly determined or unknown point spread function. The point spread function, also referred to in this disclosure as a blur kernel, is useful in digital image processing for processes such as sharpening, blurring, and edge-detection, to name a few examples. The blur kernel represents an impulse response of a focused optical system, and must be estimated to obtain a deblurred image using blind deconvolution. Some existing blind deblurring methods do not work well in the presence of noise, which can lead to inaccurate blur kernel estimation. Moreover, it has been empirically observed that even for noise-free images, image structures with a scale, or resolution, smaller than that of the blur kernel can cause large kernel estimation errors. To account for such so-called small scale structures, various structure selection techniques, such as hard/hysteresis gradient thresholding, selective edge map, and image decomposition may be incorporated into kernel estimation. However, such structure selection techniques do not adapt well to images with different scale structures. Therefore, an improved scale adaptive blind deblurring technique is needed.

BRIEF DESCRIPTION OF THE DRAWINGS

The file of this patent contains at least one drawing/photograph executed in color. Copies of this patent with color drawing(s)/photograph(s) will be provided by the Office upon request and payment of the necessary fee.

The accompanying drawings are not intended to be drawn to scale. In the drawings, each identical or nearly identical component that is illustrated in various figures is represented by a like numeral.

DETAILED DESCRIPTION

Techniques are disclosed for removing blur from a blurry image by estimating a single blur kernel and a single sharp image from a set of filtered observations of the blurry image at different scale levels. A sharp image is one which appears in focus, and a blurry image is one which appears out of focus. The sharp image can be obtained by tying the blur kernel estimation across the different scale levels and balancing the contributions of each scale level to the estimation. In accordance with an embodiment of the present disclosure, the techniques are implemented as a computer-implemented digital image processing method. The method of one such example embodiment includes receiving input data representing a blurry digital image, and applying a variable scale filter to the blurry digital image to obtain a set of filtered observations at various scale levels. A scale level is defined as a particular resolution of the image, where a large scale represents a lower resolution than a small scale. The method further includes calculating an estimated blur kernel based on each of the filtered observations, where the estimation at a large scale level is refined using the observations at successively smaller scale levels. To account for noise and small scale structures in the blurry image, the filtered observations may be weighted during the estimation to balance the contributions of each scale to the estimation of the blur kernel. A deblurred digital image is recovered by deconvolving the blurry digital image using the estimated blur kernel. Other embodiments, including systems such as stationary and mobile computing systems, as well as computer program products including any number of computer readable media, will be apparent in light of this disclosure.

Relevance of Scale Levels.

Images of natural scenes often have a multi-scale property, meaning that different scale levels reveal difference scales of structures in the image. When performing blind deblurring on such images, different scale levels may affect blur kernel estimation in different ways due to different degrees of signal component recovery in the corresponding scale levels. For instance, empirical and other studied analyses of existing blurry image recovery models suggest that large scale structures whose gradients are distributed far from each other are likely to be recovered more accurately, which benefits estimation of the blur kernel. However, it is appreciated that small image structures with gradients distributed near each other are likely to have larger recovery errors, which are harmful for blur kernel estimation. Additionally, although a linear low-pass filter can be used to suppress noise and small scale structures in a blurry image, the use of such a filter also has the effect of smoothing large scale structures, which alters the profile of the structure edges. Because large scale structures are useful for blur kernel estimation, the linear low-pass filtering may lead to inaccurate kernel estimation. Blur kernel estimation is also adversely affected by the use of some existing non-linear filtering techniques, which in the presence of blur can result in a filtered image that is not linear with respect to the latent sharp image. Furthermore, there is no universal single image scale that can be defined as a priori to maximize the performance of existing blind deblurring techniques.

To this end, and in accordance with an embodiment of the present invention, an improved technique is disclosed for removing blur from a single image by accumulating a blur kernel estimation across several scale levels of the image and balancing the contributions of the different scales to the estimation depending on the noise level in each observation. In particular, a set of observations can be obtained by applying a set of variable scale filters to a single blurry image at different scale levels (e.g., from coarse, or low resolution (large scale), to fine, or high resolution (small scale)). A single blur kernel can be estimated across all scales from the set of observations and used to obtain a single latent sharp image. Numerous configurations and variations will be apparent in light of this disclosure.

In general, observations with small noise levels will contribute more to the blur kernel estimation than observations with larger noise levels. In accordance with various embodiments, a variable scale filter can be used to perform deblurring on the blurry image at the same spatial resolution as the original image, rather than at a downscaled resolution as done in some existing deblurring techniques, which avoids the additional estimation error caused by interpolation between different spatial scales. Further, in contrast to some existing deblurring techniques in which image filtering is performed prior to deblurring, in some embodiments knowledge of the variable scale filter is incorporated into a deblurring model. In this manner, deblurring can be performed in multiple scale spaces, where the contribution of each scale space is adapted for each image. Large scale space is more robust to image noise, and thus is more effective in stabilizing the estimation; however, only large scale structures are recoverable (visible) in this space. Small scale space offers the potential to recover more fine details, but is less robust to image noise. Thus, by conducting deblurring in multiple scale spaces, such as described in this disclosure, the complementary properties of different scales can be utilized for robust blind deblurring. For example, deblurring can be performed in a cascaded way, starting the blur kernel estimation from a large scale and then reducing the scale for each successive cascaded scale level. The blur kernel estimation from the previous scale level is used as the starting point, or baseline, for further estimating the blur kernel at the successively smaller scale levels. Accordingly, the blur kernel is refined along with the resolution of the scale space, and in some instances may become sufficiently accurate for deblurring the image before reaching the finest resolution level.

A uniformly blurry image can be modeled as follows:

$$y=k*x+n \quad (1)$$

Figure 1:
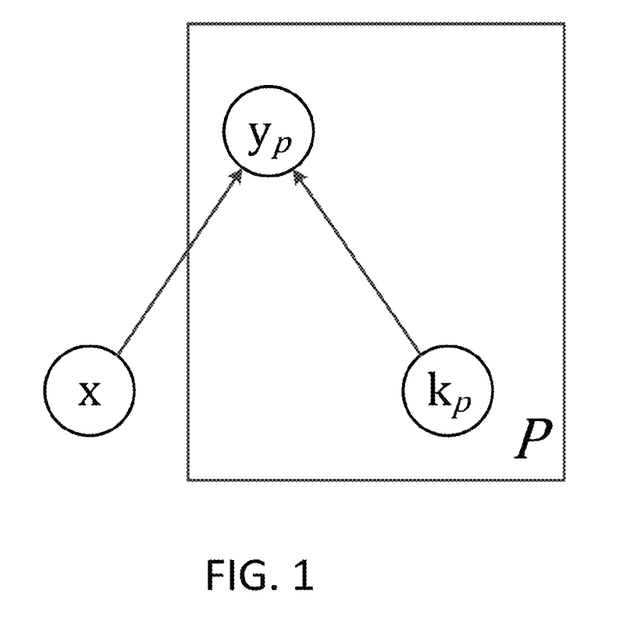
FIG. 1 is a graphical representation of an example blind deblurring model, in accordance with an embodiment of the present invention.

In equation (1), y is the observed blurry input image, x is the unknown sharp image, k is the unknown blur kernel, also referred to in this disclosure as a point spread function, and n is a zero-mean Gaussian noise term. FIG. 1 is a graphical representation of such an example blind deblurring model, in accordance with an embodiment. In this model, multi-image blind deblurring uses multiple observations $\{y_p\}$ as inputs for estimating multiple blur kernels $\{k_p\}$ for recovering a single sharp image x. Similarly, single image blind deblurring estimates the single sharp image x and a single blur kernel k from a single observed signal y (i.e., P is a set of one). As noted above, empirically, large scale structures whose gradients are distributed far from each other are likely to be recovered very accurately using this model. For example, in the noiseless case, it has been shown that a sharp image x can be recovered exactly from the blurred image y and a Gaussian kernel k if the minimum distance between point sources in x is at least $2/f_c$, where $f_c$ denotes the cut-off frequency of the Gaussian kernel k. Since blind deblurring is sensitive to noise and small scale structures, the results of blind deblurring can be improved by filtering the blurry image to reduce the noise and smooth small scale structures. However, linear filtering may adversely affect the edges of salient large scale structures, which are important for accurately estimating the blur kernel. To achieve noise reduction while retaining the latent edge structures, non-linear filtering may be used, such as anisotropic diffusion, Bilateral filtering, or sparse regression. However, these non-linear filtering approaches assume the absence of motion blur, and thus can cause over-sharpening of the edge structures and over-smoothing of the image details when blur is present. This can result in a filtered image that is no longer linear with respect to the latent sharp image, which makes accurate blur kernel estimation difficult.

To this end, and in accordance with an embodiment of the present invention, a cascaded scale space formulation for blind deblurring is disclosed in which blur kernel estimation progresses from large scale observations of the blurry image to progressively smaller scales. Further, the contributions of each scale level are balanced with respect to the noise level in the filtered observations.

Figure 2:
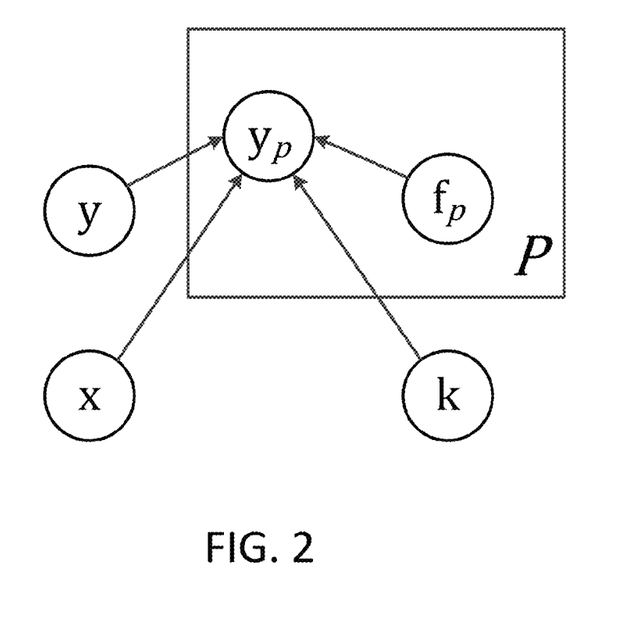
FIG. 2 is a graphical representation of another example blind deblurring model, in accordance with an embodiment of the present invention.

FIG. 2 is a graphical representation of another example blind deblurring model, in accordance with an embodiment. In this model, a single latent sharp image x and a single blur kernel k are estimated from a set of observations $\{y_p\}$ created from the original blurry image y with a set of filters $\{f_p\}$. In more detail, for an image x, a scale-space representation corresponding to a Gaussian filter $G_s$ is defined by the convolution $G_s*x$, where the variance s is referred to as the scale parameter. Images of natural scenes have a multi-scale property, meaning that different levels of image resolution reveal different aspects of the structures in the scene. For example, the edges of large structures may be recoverable at low resolution, but the edges of small structures may be too fine to distinguish. As such, different scale spaces may play different roles for blur kernel estimation, due to the different recoverability of the signal components in the corresponding scale spaces. In accordance with an embodiment, a variable scale filter can be applied to the blurry image. This filter defines the scale space where the blind estimation process is operated. With the scale filter, a blur estimation procedure similar to the conventional coarse-to-fine estimation by constructing an image pyramid can be performed. For instance, given a current blur kernel estimation k, the update of the blurry image x is effectively a multi-image blind deblurring problem based on the multiple observations y obtained with the variable scale filter. However, in contrast to existing techniques, note that the deblurring is performed in a scale space having the same spatial resolution as the original image rather than a downscaled space as conventionally done. This avoids the additional estimation error caused by interpolation between spatial scales in the image pyramid. To mitigate the problem of structure smoothing, knowledge about the filter is incorporated into the deblurring model, which is different from the way of using filtering simply as a pre-processing step. In this manner, deblurring is performed in multiple scale spaces, with the contribution of each scale space adapted for each input image.

Example Blur Kernel Estimation Methodology

According to an embodiment, blur kernel estimation is initially performed by recovering large scale structures from the blurry image at a low resolution using a scale-adaptive filter. The estimation from the initial scale is then used as the starting point for estimating the blur kernel at a reduced scale (e.g., higher resolution). In this manner, the estimated blur kernel is refined with each successively higher resolution of the scale space. In some cases, the estimated blur kernel may become accurate enough for non-blind deblurring before reaching the finest resolution level (e.g., it is not always necessary to refine the blur kernel estimation at all scales to achieve acceptable results). In some embodiments, the scale-adaptive filter includes a set of Gaussian filters with decreasing radius or a set of directional filters. Large scale space is more robust to image noise, and thus is more effective in stabilizing the estimation. It will be noted that large scale structures are recoverable in this space. Small scale space offers the potential to recover more fine details, but is less robust to image noise. By conducting deblurring in multiple scale spaces simultaneously, a unified framework can be used that is based on the complementary property of different scales for robust blind deblurring. Furthermore, since different scales may contribute differently to the kernel estimation, a distinct noise level parameter $\lambda_p$ can be used for each scale, which reflects the relative contribution of that scale to the estimation. For uniformly blurry images, the model of equation (1) can be modified to accumulate a cost function over P filtered observations with adaptive noise parameters as follows:

$$\min_{\{\lambda_p\}, k \geq 0, x} \sum_{p=1}^{P} \frac{1}{\lambda_p} \|f_p * y - f_p * k * x\|_2^2 + \sum_{p,i} \min_{Y_i} \frac{x_i^2}{Y_i} + \log(\lambda_p + Y_i \|k_p\|_2^2) + (n-m) \sum_{p} \log\lambda_p \quad (2)$$

With the cost function of equation (2) (also shown in FIG. 3B), the contribution of each filtered observation $y_p$ constructed by $f_p$ is reflected by weight $\lambda_p^{-1}$. The parameters $\{\lambda_p^{-1}\}$ can be initialized uniformly across all filters and then learned during the kernel estimation process automatically. As such, a smaller noise level estimation indicates a larger contribution in estimation. However, it will be understood that the distribution of the contribution weights for the same set of filters may change under different input noise levels. For example, filters with smaller radius may contribute more in the noise-free case, while in the noisy case, filters with larger radius contribute more. Further, the distribution of the contribution weights can evolve during the iterative estimation process. For example, in the noise-free case, starting with uniform weights, the middle-scale filters may contribute the most at the beginning of the iterations, while smaller-scale filters may contribute more to the estimation later on.

According to an embodiment, the set of scale-adaptive filters $\{f_p\}$ includes a fixed set $\{f_1^{\sigma_1}, f_2^{\sigma_2}, f_P^{\sigma_P}\}$, where $\sigma_1 < \sigma_2 < \ldots < \sigma_P$ ($\sigma$ is the standard deviation of the Gaussian distribution, and P represents the set of filtered observations). In another embodiment, the set of scale-adaptive filters $\{f_p\}$ is constructed iteratively, starting with a large radius $\{f_1^{\sigma_1}\}$ and then progressively adding filters with smaller radii to the set at each i-th iteration (e.g., at iteration i, the set may include $\{f_1^{\sigma_1}, f_2^{\sigma_2}, \ldots, f_{i-1}^{\sigma_{i-1}}, f_i^{\sigma_i}\}$, where of $\sigma_1 < \sigma_2 < \ldots < \sigma_{i-1} < \sigma_i$).

The cost function of equation (2) realizes several advantages. First, this model exploits both the regularization of sharing the latent sharp image x across all filtered observations and the knowledge about the set of scale-adaptive filters $\{f_p\}$. In this way, k is recovered directly without post-processing. Second, this model can be extended to handle non-uniform blur. Third, there are no inherent limitations on the form of the filters that can be used besides Gaussian filters (e.g., directional filters can be used).

As noted above, according to an embodiment, the uniform blur model of equation (2) can be extended to handle non-uniform blur by using a generalized observation model and representing the blurry image as the summation of differently transformed versions of the latent sharp image as follows:

$$\min_{\lambda, w \geq 0, x} \sum_{p=1}^{P} \frac{1}{\lambda_p} \|y_p - H_p x\|_2^2 + \sum_{p,i} \min_{Y_i} \frac{x_i^2}{Y_i} + \log(\lambda_p + Y_i \|h_{ip}\|_2^2) + (n-m) \sum_{p} \log\lambda_p \quad (3)$$

where $H_p \triangleq F_p \Sigma_j w_j P_j$ is the compound operator incorporating both the additional filter and the non-uniform blur (also shown in FIG. 3C). $F_p$ is the convolutional matrix form of $f_p$, and $h_{ip}$ denotes the effective compound local kernel at site i in the image plane constructed with w and the Set of Transformation Operators.

Example Methodology

If a blur kernel k has a clear cut-off frequency and the target signal contains image structures at distinct scales, then the structures can be suppressed using a scale smaller than k with an appropriate scale filter $f_p$, and deblurring can be performed such as described with respect to equation (1). However, if the blur kernels are non-parametric or have complex forms, then there is no single suitable cut-off frequency, which may cause undesirable smoothing of large scale structures or inaccurate blur kernel estimation. Moreover, as discussed above, natural images have a multi-scale property, meaning different scale spaces reveal different image structures. In these other cases, deblurring can be performed using a variable scale filter, such as described with respect to FIGS. 3A and 3B.

Figure 3A:
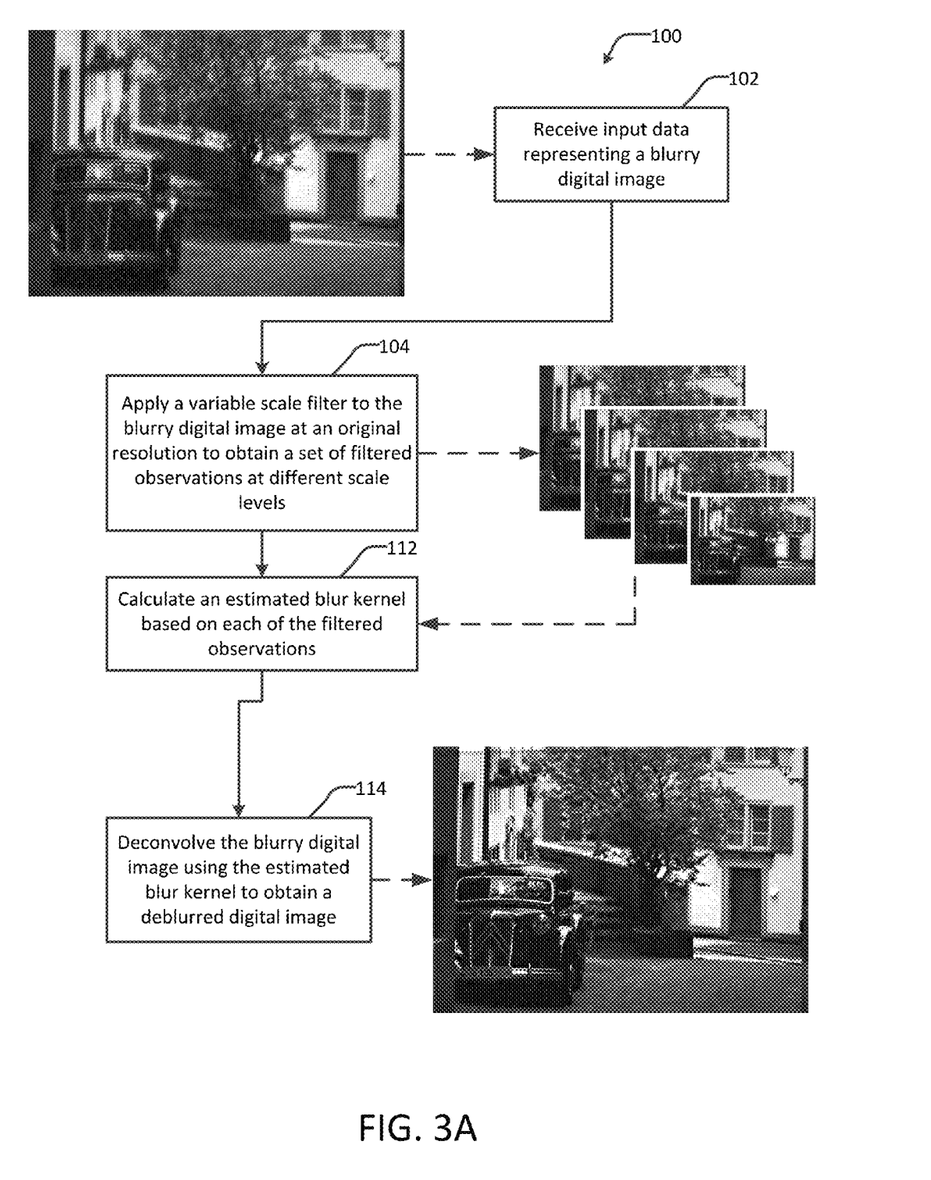
FIG. 3A is a flow diagram of an example methodology for removing blur from an image, in accordance with an embodiment of the present invention.
Figure 3B:
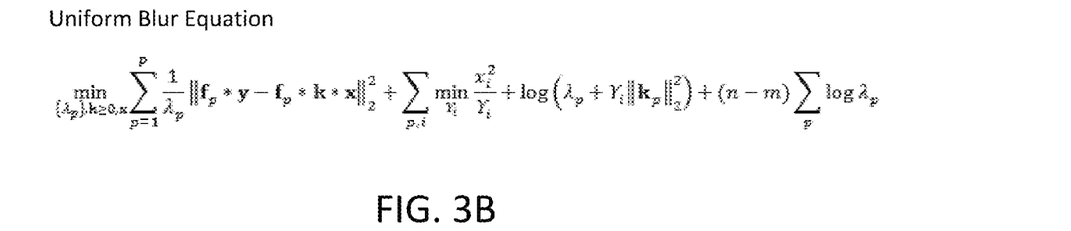
FIGS. 3B and 3C show several example equations for calculating an estimated blur kernel, in accordance with various embodiments of the present invention.
Figure 3C:
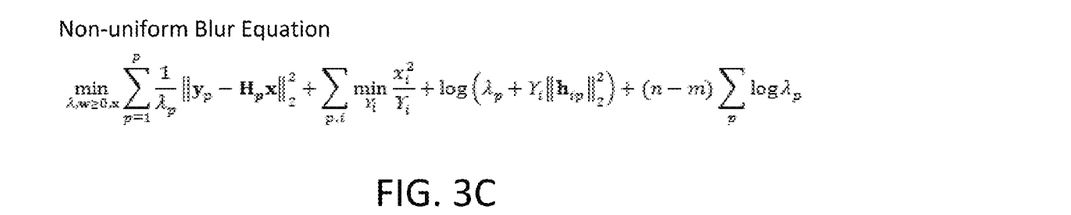
Figure 6A:
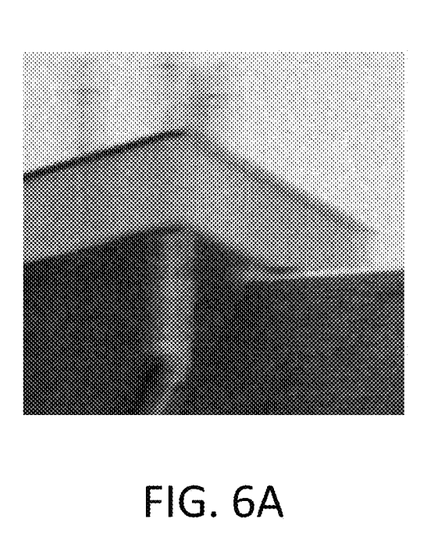
Figure 6B:
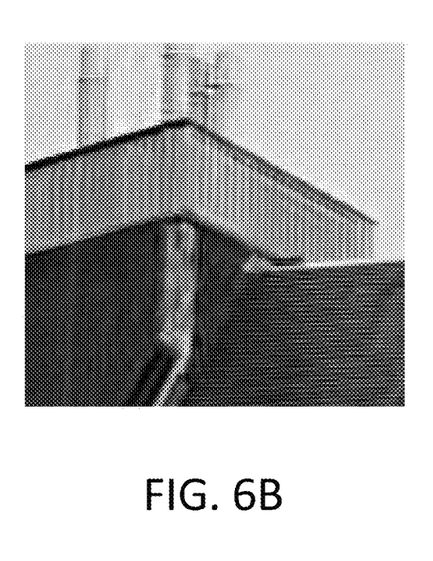
Figure 7A:
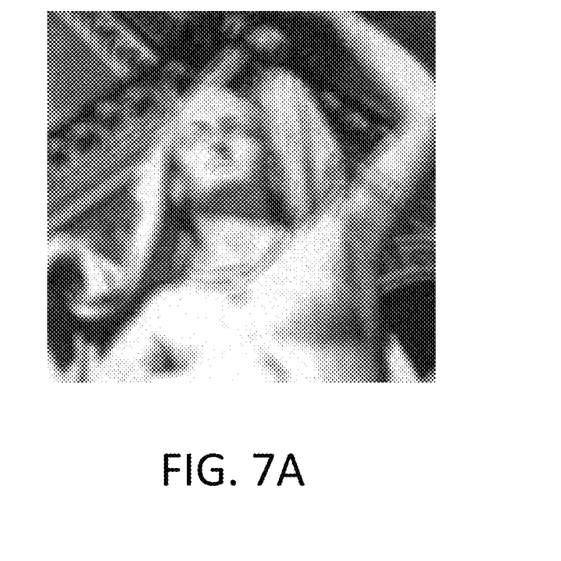
Figure 7B:
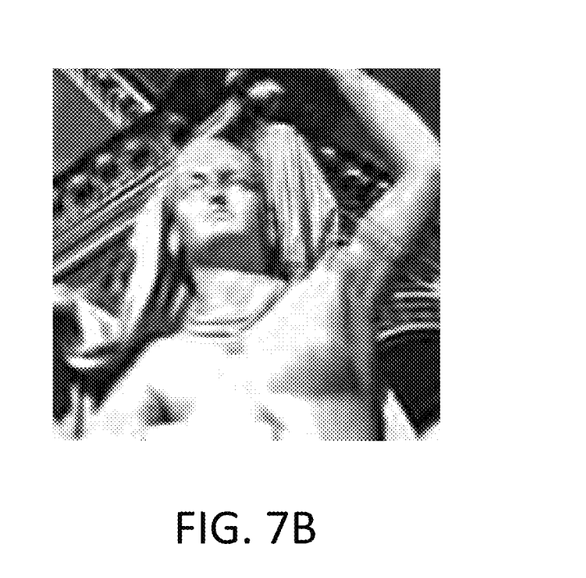

FIG. 3A is a flow diagram of an example methodology 100 for removing blur from an image, according to an embodiment. Blur is removed from the image by accumulating a blur kernel estimation across several scale levels of the image and balancing the contributions of the different scales to the estimation depending on the noise level in each observation. The method 100 may be performed, for example, in whole or in part by the computing device 1000 of FIG. 6. The method 100 begins by receiving 102 input data representing a blurry digital image and applying 104 a variable scale filter to the blurry digital image at an original resolution to obtain a set of filtered observations at different scale levels. The variable scale filter may, for example, include a set of Gaussian noise filters with decreasing radius, or a set of directional noise filters. The method 100 continues by calculating 112 an estimated blur kernel based on each of the filtered observations. Equations (2) (FIG. 3B) or (3) (FIG. 3C) can be used to obtain the estimated blur kernel for uniform and non-uniform blur cases, respectively. The method 100 continues by deconvolving 114 the blurry digital image using the estimated blur kernel to obtain a deblurred digital image.

Figure 3D:
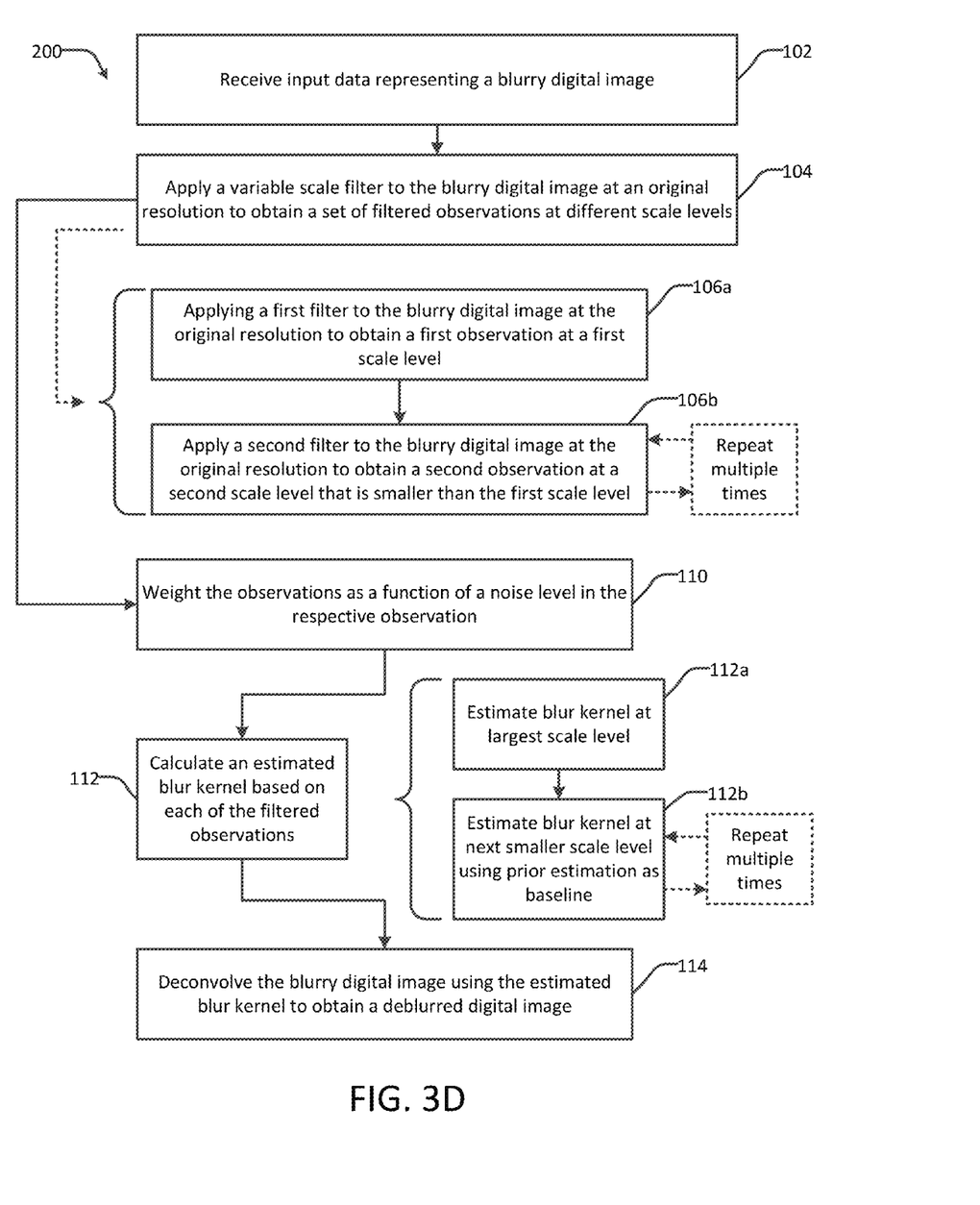
FIG. 3D is a flow diagram of another example methodology for removing blur from an image, in accordance with an embodiment of the present invention.
Figure 4A:
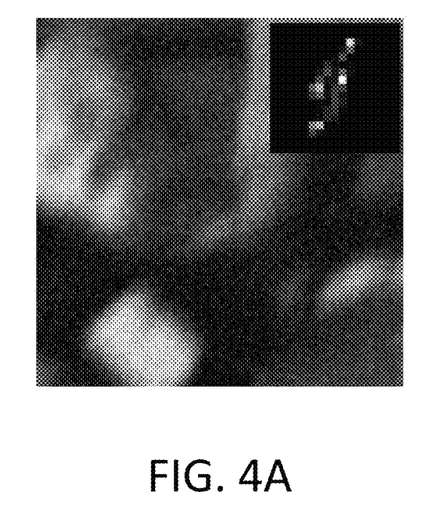
FIGS. 4A, 5A, 6A and 7A show example blurry images.
Figure 4B:
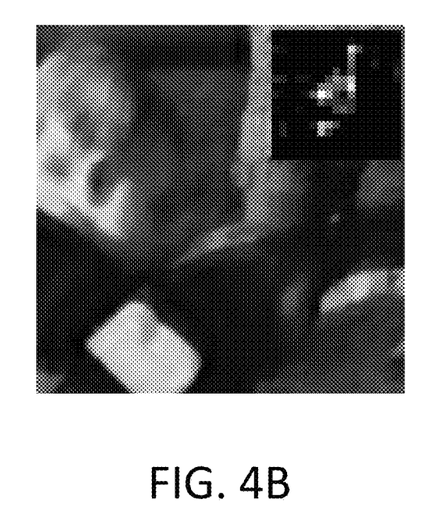
FIGS. 4B, 5B, 6B and 7B show the results of scale adaptive blind deblurring of the blurry images of FIGS. 4A, 5A, 6A and 7A, respectively, in accordance with an embodiment of the present invention.
Figure 5A:
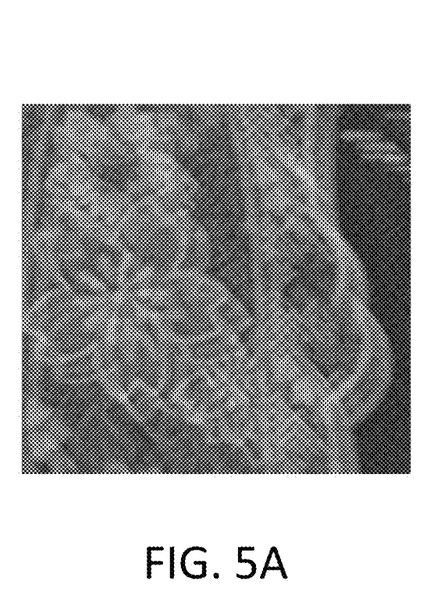
Figure 5B:
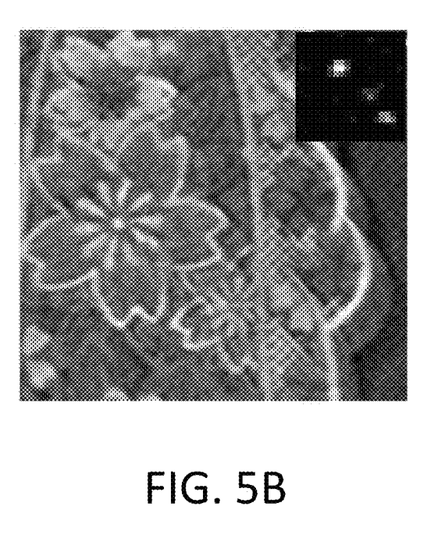

FIG. 3D is a flow diagram of another example methodology 200 for removing blur from an image, according to an embodiment. The method 200 may be performed, for example, in whole or in part by the computing device 1000 of FIG. 6. The method 200 begins by receiving 102 input data representing a blurry digital image and applying 104 a variable scale filter to the blurry digital image at an original resolution to obtain a set of filtered observations at different scale levels. The variable scale filter may, for example, include a set of Gaussian noise filters with decreasing radius, or a set of directional noise filters. In some cases, the variable scale filter includes a first filter and a second filter that is different from the first filter. In such cases, the method 200 includes applying 106*a* the first filter to the blurry digital image at the original resolution to obtain a first observation at a first scale level, and applying 106*b* the second filter to the blurry digital image at the original resolution to obtain a second observation at a second scale level that is smaller than the first scale level. The applying step 106*b* may be repeated at iteratively smaller scale levels to obtain additional filtered observations of the blurry image. As noted above, in some cases, the estimated blur kernel may become accurate enough for non-blind deblurring before reaching the finest resolution level. In such cases, it is not always necessary to obtain observations at all scale levels to achieve acceptable results. In some cases, the method 200 includes weighting 110 each of the filtered observations as a function of a noise level in the respective filtered observation. The weight of each filtered observation may, for example, be inversely proportional to the noise level.

The method 200 continues by calculating 112 an estimated blur kernel based on each of the filtered observations, which may be weighted as described above, and with further reference to equations (2) (FIG. 3B) and (3) (FIG. 3C) for uniform and non-uniform blur cases, respectively. In some cases, the estimation calculation 110 includes calculating 112*a* a first estimated blur kernel based on the first observation, calculating 112*b* a second estimated blur kernel based on the second observation using the first estimated blur kernel as a baseline, and iteratively accumulating the estimated blur kernel from the first estimated blur kernel and the second estimated blur kernel. The calculating step 112*b* may be repeated for some or all of the filtered observations in a large-to-small scale cascading manner, using the prior estimation as a baseline for further refining the estimated blur kernel. The method 200 continues by deconvolving 114 the blurry digital image using the estimated blur kernel to obtain a deblurred digital image.

Example Results

FIGS. 4A, 5A, 6A and 7A show example blurry images, each of which may be used to estimate a single sharp image. FIGS. 4B, 5B, 6B and 7B show the results of scale adaptive blind deblurring of the blurry images of FIGS. 4A, 5A, 6A and 7A, respectively, in accordance with an embodiment. As can be seen in these figures, the resulting images, which were obtained using, for example, equations (2) or (3), are substantially sharper than the original blurry image.

Example Computing Device

Figure 8:
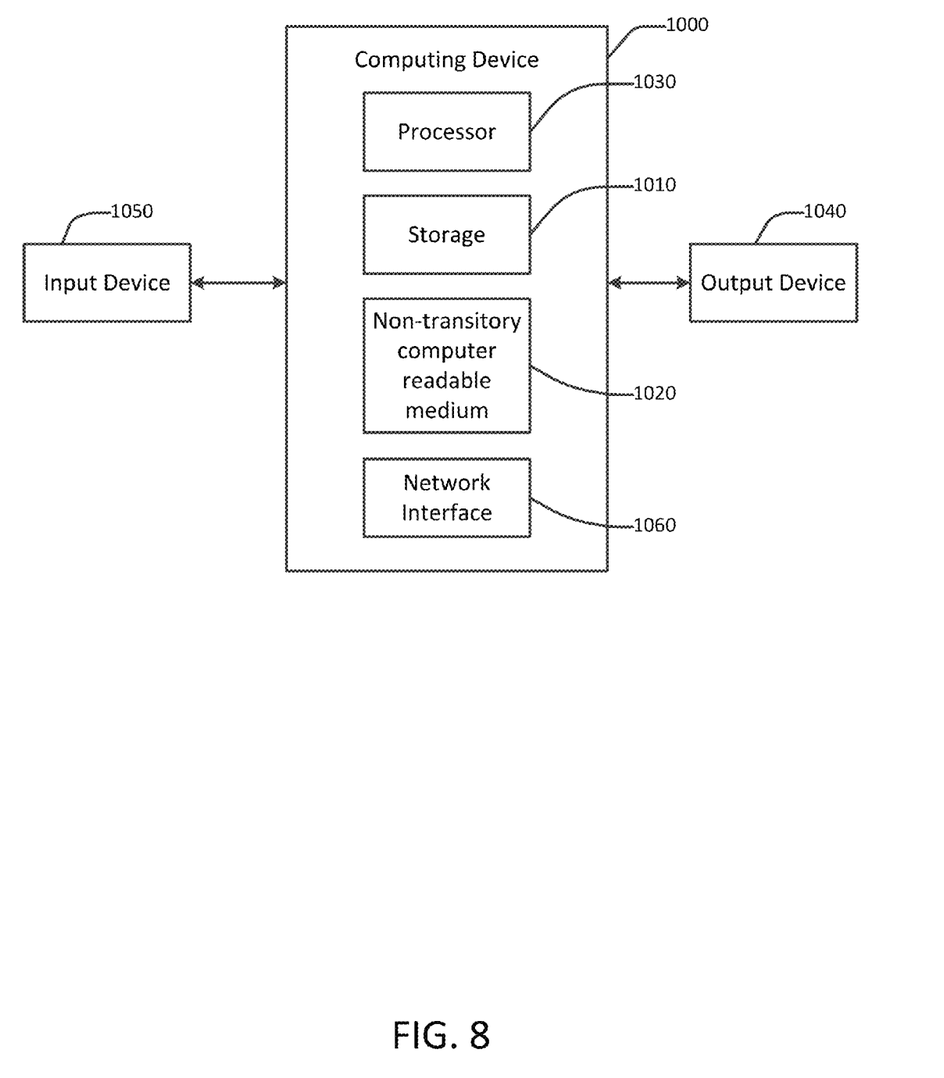
FIG. 8 is a block diagram representing an example computing device that may be used in accordance with an embodiment of the present invention.

FIG. 8 is a block diagram representing an example computing device 1000 that may be used to perform any of the techniques as variously described in this disclosure. For example, the methodologies 100 and 200 of FIGS. 3A and 3B, or any portions thereof, may be implemented in the computing device 1000. The computing device 1000 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure. A distributed computational system may be provided comprising a plurality of such computing devices.

The computing device 1000 includes one or more storage devices 1010 and/or non-transitory computer-readable media 1020 having encoded thereon one or more computer-executable instructions or software for implementing techniques as variously described in this disclosure. The storage devices 1010 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught in this disclosure. The storage device 1010 may include other types of memory as well, or combinations thereof. The storage device 1010 may be provided on the computing device 1000 or provided separately or remotely from the computing device 1000. The non-transitory computer-readable media 1020 may include, but are not limited to, one or more types of hardware memory, non-transitory tangible media (for example, one or more magnetic storage disks, one or more optical disks, one or more USB flash drives), and the like. The non-transitory computer-readable media 1020 included in the computing device 1000 may store computer-readable and computer-executable instructions or software for implementing various embodiments. The computer-readable media 1020 may be provided on the computing device 1000 or provided separately or remotely from the computing device 1000.

The computing device 1000 also includes at least one processor 1030 for executing computer-readable and computer-executable instructions or software stored in the storage device 1010 and/or non-transitory computer-readable media 1020 and other programs for controlling system hardware. Virtualization may be employed in the computing device 1000 so that infrastructure and resources in the computing device 1000 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1000 through an output device 1040, such as a screen or monitor, which may display one or more user interfaces provided in accordance with some embodiments. The output device 1040 may also display other aspects, elements and/or information or data associated with some embodiments. The computing device 1000 may include other I/O devices 1050 for receiving input from a user, for example, a keyboard, a joystick, a game controller, a pointing device (e.g., a mouse, a user's finger interfacing directly with a display device, etc.), or any suitable user interface. The computing device 1000 may include other suitable conventional I/O peripherals, such as a camera 1052. The computing device 1000 can include and/or be operatively coupled to various suitable devices for performing one or more of the functions as variously described in this disclosure.

The computing device 1000 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device 1000 and performing the operations described in this disclosure.

In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system can be implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions performed by the user computing system, as described in this disclosure, can be performed by similar processors and/or databases in different configurations and arrangements, and that the depicted embodiments are not intended to be limiting. Various components of this example embodiment, including the computing device 1000, can be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described in this disclosure can be combined in any number of configurations. One example embodiment provides a computer-implemented digital image processing method including receiving, by a processor, input data representing a blurry digital image; applying, by the processor, a variable scale filter to the blurry digital image at an original resolution to obtain a set of filtered observations at different scale levels; calculating, by the processor, an estimated blur kernel based on each of the filtered observations; and deconvolving, by the processor, the blurry digital image using the estimated blur kernel to obtain a deblurred digital image. In some cases, the variable scale filter includes a first filter and a second filter that is different from the first filter (e.g., the second filter has a smaller radius or Gaussian distribution than the first filter), where the method includes applying the first filter to the blurry digital image at the original resolution to obtain a first observation at a first scale level; and applying the second filter to the blurry digital image at the original resolution to obtain a second observation at a second scale level that is smaller than the first scale level. In some such cases, the method includes calculating a first estimated blur kernel based on the first observation; calculating a second estimated blur kernel based on the second observation using the first estimated blur kernel as a baseline; and iteratively accumulating the estimated blur kernel from the first estimated blur kernel and the second estimated blur kernel. In some such cases, the estimated blur kernel may become accurate enough for non-blind deblurring before reaching the finest resolution level (e.g., it is not always necessary to refine the blur kernel estimation at all scales to achieve acceptable results). In some cases, the method includes weighting each of the filtered observations as a function of a noise level in the respective filtered observation, where the estimated blur kernel is calculated based on the weighted filtered observations. In some such cases, the weight of each filtered observation is inversely proportional to the noise level. In some cases, the variable scale filter includes a plurality of Gaussian noise filters with decreasing radius. In some other cases, the variable scale filter includes a plurality of directional noise filters. In some cases, some or all of the functions variously described in this paragraph can be performed in any order and at any time by one or more different processors.

Another example embodiment provides a system including a storage having at least one memory, and one or more processors each operatively coupled to the storage. The one or more processors are configured to carry out a process including receiving input data representing a blurry digital image; applying a variable scale filter to the blurry digital image at an original resolution to obtain a set of filtered observations at different scale levels; calculating an estimated blur kernel based on each of the filtered observations; and deconvolving the blurry digital image using the estimated blur kernel to obtain a deblurred digital image. In some cases, the variable scale filter includes a first filter and a second filter that is different from the first filter (e.g., the second filter has a smaller radius or Gaussian distribution than the first filter), and the process includes applying the first filter to the blurry digital image at the original resolution to obtain a first observation at a first scale level; and applying the second filter to the blurry digital image at the original resolution to obtain a second observation at a second scale level that is smaller than the first scale level. In some such cases, the process includes calculating a first estimated blur kernel based on the first observation; calculating a second estimated blur kernel based on the second observation using the first estimated blur kernel as a baseline; and iteratively accumulating the estimated blur kernel from the first estimated blur kernel and the second estimated blur kernel. In some such cases, the estimated blur kernel may become accurate enough for non-blind deblurring before reaching the finest resolution level (e.g., it is not always necessary to refine the blur kernel estimation at all scales to achieve acceptable results). In some cases, the process includes weighting each of the filtered observations as a function of a noise level in the respective filtered observation, where the estimated blur kernel is calculated based on the weighted filtered observations. In some such cases, the weight of each filtered observation is inversely proportional to the noise level. In some cases, the variable scale filter includes two or more Gaussian noise filters with decreasing radius. In some cases, the variable scale filter includes one or more directional noise filters In some cases, some or all of the functions variously described in this paragraph can be performed in any order and at any time by one or more different processors.

Another embodiment provides a non-transient computer-readable medium or computer program product having instructions encoded thereon that when executed by one or more processors cause the processor to perform one or more of the functions defined in the present disclosure. For example, a computer program product may include instructions for performing a process that includes receiving input data representing a blurry digital image; applying a variable scale filter to the blurry digital image at an original resolution to obtain a set of filtered observations at different scale levels; calculating an estimated blur kernel based on each of the filtered observations; and deconvolving the blurry digital image using the estimated blur kernel to obtain a deblurred digital image. In some cases, the variable scale filter includes a first filter and a second filter that is different from the first filter (e.g., the second filter has a smaller radius or Gaussian distribution than the first filter), and the process includes applying the first filter to the blurry digital image at the original resolution to obtain a first observation at a first scale level; and applying the second filter to the blurry digital image at the original resolution to obtain a second observation at a second scale level that is smaller than the first scale level. In some such cases, the process includes calculating a first estimated blur kernel based on the first observation; calculating a second estimated blur kernel based on the second observation using the first estimated blur kernel as a baseline; and iteratively accumulating the estimated blur kernel from the first estimated blur kernel and the second estimated blur kernel. In some such cases, the estimated blur kernel may become accurate enough for non-blind deblurring before reaching the finest resolution level (e.g., it is not always necessary to refine the blur kernel estimation at all scales to achieve acceptable results). In some cases, the process includes weighting each of the filtered observations as a function of a noise level in the respective filtered observation, where the estimated blur kernel is calculated based on the weighted filtered observations. In some such cases, the weight of each filtered observation is inversely proportional to the noise level. In some cases, the variable scale filter includes two or more Gaussian noise filters with decreasing radius. In some cases, the variable scale filter includes one or more directional noise filters In some cases, some or all of the functions variously described in this paragraph can be performed in any order and at any time by one or more different processors.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented digital image processing method comprising:
    receiving, by a processor, input data representing a blurry digital image;
    applying, by the processor, a variable scale filter to the blurry digital image at an original resolution to obtain a set of filtered observations at different scale levels;
    calculating, by the processor, an estimated blur kernel based on each of the filtered observations; and
    deconvolving, by the processor, the blurry digital image using the estimated blur kernel to obtain a deblurred digital image,
    wherein the variable scale filter includes a first filter and a second filter that is different from the first filter, and wherein the method further comprises:
    applying the first filter to the blurry digital image at the original resolution to obtain a first observation at a first scale level;
    applying the second filter to the blurry digital image at the original resolution to obtain a second observation at a second scale level that is smaller than the first scale level;
    calculating a first estimated blur kernel based on the first observation;
    calculating a second estimated blur kernel based on the second observation using the first estimated blur kernel as a baseline; and
    iteratively accumulating the estimated blur kernel from the first estimated blur kernel and the second estimated blur kernel.

2. The method of claim 1, further comprising weighting each of the filtered observations as a function of a noise level in the respective filtered observation, wherein the estimated blur kernel is calculated based on the weighted filtered observations.

3. The method of claim 2, wherein the weight of each filtered observation is inversely proportional to the noise level.

4. The method of claim 1, wherein the variable scale filter includes a plurality of Gaussian noise filters with decreasing radius.

5. The method of claim 1, wherein the variable scale filter includes a plurality of directional noise filters.

6. A system comprising:
    a storage; and
    a processor operatively coupled to the storage, the processor configured to execute instructions stored in the storage that when executed cause the processor to carry out a process comprising:
    receiving input data representing a blurry digital image;
    applying a variable scale filter to the blurry digital image at an original resolution to obtain a set of filtered observations at different scale levels;
    calculating an estimated blur kernel based on each of the filtered observations; and
    deconvolving the blurry digital image using the estimated blur kernel to obtain a deblurred digital image,
    wherein the variable scale filter includes a first filter and a second filter that is different from the first filter, and wherein the process further comprises:
    applying the first filter to the blurry digital image at the original resolution to obtain a first observation at a first scale level;
    applying the second filter to the blurry digital image at the original resolution to obtain a second observation at a second scale level that is smaller than the first scale level;
    calculating a first estimated blur kernel based on the first observation;
    calculating a second estimated blur kernel based on the second observation using the first estimated blur kernel as a baseline; and
    iteratively accumulating the estimated blur kernel from the first estimated blur kernel and the second estimated blur kernel.

7. The system of claim 6, wherein the process further comprises weighting each of the filtered observations as a function of a noise level in the respective filtered observation, wherein the estimated blur kernel is calculated based on the weighted filtered observations.

8. The system of claim 7, wherein the weight of each filtered observation is inversely proportional to the noise level.

9. The system of claim 6, wherein the variable scale filter includes a plurality of Gaussian noise filters with decreasing radius.

10. The system of claim 6, wherein the variable scale filter includes a plurality of directional noise filters.

11. A non-transitory computer program product a non-transitory computer readable medium having instructions encoded thereon that when executed by one or more processors cause a process to be carried out, the process comprising:
　receiving input data representing a blurry digital image;
　applying a variable scale filter to the blurry digital image at an original resolution to obtain a set of filtered observations at different scale levels;
　calculating an estimated blur kernel based on each of the filtered observations; and
　deconvolving the blurry digital image using the estimated blur kernel to obtain a deblurred digital image,
　wherein the variable scale filter includes a first filter and a second filter that is different from the first filter, and wherein the process further comprises:
　applying the first filter to the blurry digital image at the original resolution to obtain a first observation at a first scale level;
　applying the second filter to the blurry digital image at the original resolution to obtain a second observation at a second scale level that is smaller than the first scale level;
　calculating a first estimated blur kernel based on the first observation;
　calculating a second estimated blur kernel based on the second observation using the first estimated blur kernel as a baseline; and
　iteratively accumulating the estimated blur kernel from the first estimated blur kernel and the second estimated blur kernel.

12. The non-transitory computer program product of claim 11, wherein the process further comprises weighting each of the filtered observations as a function of a noise level in the respective filtered observation, wherein the estimated blur kernel is calculated based on the weighted filtered observations.

13. The non-transitory computer program product of claim 12, wherein the weight of each filtered observation is inversely proportional to the noise level.

14. The non-transitory computer program product of claim 11, wherein the variable scale filter includes at least one of a plurality of Gaussian noise filters with decreasing radius, and a plurality of directional noise filters.

* * * * *